(12) United States Patent
Dyer

(10) Patent No.: US 7,234,762 B2
(45) Date of Patent: Jun. 26, 2007

(54) TRAILER EDGE RAIL SYSTEM

(76) Inventor: John K. Dyer, 404 State Rd., Rte. 152, W. Nottingham, NH (US) 03291

( * ) Notice: Subject to any disclaimer, the term of this patent is extended or adjusted under 35 U.S.C. 154(b) by 0 days.

(21) Appl. No.: 10/994,716

(22) Filed: Nov. 22, 2004

(65) Prior Publication Data

US 2006/0108832 A1   May 25, 2006

(51) Int. Cl.
*B62D 25/00* (2006.01)
(52) U.S. Cl. .................................................. 296/185.1
(58) Field of Classification Search ............. 296/185.1, 296/100.17, 136.01
See application file for complete search history.

(56) References Cited

U.S. PATENT DOCUMENTS 4,018,480 A * 4/1977 Stone ........................... 298/27
4,453,761 A * 6/1984 Felburn ........................ 296/43
4,955,661 A * 9/1990 Mattice ....................... 296/171
5,769,478 A * 6/1998 Vernese .................. 296/24.31

* cited by examiner

*Primary Examiner*—H Gutman
(74) *Attorney, Agent, or Firm*—Bourque and Associates

(57) ABSTRACT

A trailer edge rail system for use with a trailer having a removable cover includes a mount having a first end adapted to be secured to an edge of the trailer. The mount also includes at least one protrusion extending generally upwardly and parallel to a face of the edge of the trailer. The protrusion acts as a guide and aids in preventing an object (such as a snowmobile or the like) from being loaded too close to or driven off the edge of the trailer. A lip extends generally outwardly and transverse to the protrusion. In the preferred embodiment, the first end includes a C-shaped bracket. Alternatively, the first end may be molded with the trailer. The edge-rail system also preferably includes a longitudinally disposed cavity sized and shaped to accept one or more wires, hoses, or lights.

10 Claims, 5 Drawing Sheets

TRAILER EDGE RAIL SYSTEM

TECHNICAL FIELD

The present invention relates to trailers and more particularly, relates to an edge rail system for trailers and the like having a hinged or operable cover or lid.

BACKGROUND INFORMATION

The use of lids, covers, or tops 1, FIG. 1, to protect the contents on a trailer 2 from the elements, debris, and theft is well known. In many circumstances, the ability to remove or pivot the cover 1 relative to the trailer 2 is often desirable, particularly in situations where large objects such as, but not limited to, snowmobiles, automobiles, motorcycles, and the like, are to be placed on the trailer 2. Traditionally, these removable covers have been secured to the trailer 2 using one or more mounts secured to the deck 4 of the trailer 2.

The known mounts 5 generally include a bracket area 9 sized and shaped to fit around the deck 4 of the trailer 2. The bracket area 9 is generally secured to the deck using a plurality of fasteners or the like (not shown). The mount 5 also includes a lip region 6 and a leg 7. The lip region 6 extends outwardly from the deck while the leg 7 extends generally upwardly and perpendicular to the deck 4.

The cover 1 also typically includes a weather sealer 8 secured to the perimeter P of the cover 1. The weather sealer 8 extends outwardly and downwardly from the cover 1, and is sized and shaped to fit around the top of the leg 7 of the mount 5. In this manner, the weather sealer 8 helps prevent the material from entering into trailer 2.

While the known removable covers 1 work well, they suffer from several disadvantages. For example, one disadvantage of the known removable covers 1 results from the difficulty in lowering the cover 1. Because the cover 1 is placed on the inside of the leg 7 of the mount 5, the cover 1 will not close/shut if the equipment is placed too close to the mount 5.

For example, while storing two or more snowmobiles or the like on a trailer 2, it is often necessary to load the snowmobiles as close to the edges 22 of the trailer 2 as possible in order to allow for enough distance between the snowmobiles. However, because the cover 1 must fit on the inside of the mount 5 in order to properly seal the cover 1 to the trailer 2, the snowmobiles often protrude into the space where the cover 1 must go. As a result, the cover 1 will not close. While it is possible to move the snowmobiles, this is undesirable since moving the snowmobiles once the snowmobiles have been loaded is often extremely difficult, creates additional work, and further complicates the loading process. Additionally, traditional hinged covers include struts (such as gas pressurized struts) that support the cover and hold it open. These struts are mounted on the inside of the cover, and are particularly susceptible to damage when loading and unloading snowmobiles.

Another difficulty in closing the known removable covers 1 results from debris (such as snow, dirt, ice, leaves, and the like) building up close to the edge 22 of the trailer 2. Because the weather sealer 8 is in close proximity to the leg 7 of the mount 5 in the closed position, this debris will prevent the cover 1 from closing properly. This is particularly problematic when the trailer 2 and cover 1 are used to transport snowmobiles since snow and ice often falls off of the snowmobile during loading and unloading. Additionally, rain, ice, and snow falling can also build-up along the edges 22 of the trailer 2 while the cover 1 is off or open.

Yet another disadvantage of the known cover 1 design is that ice can get trapped within the channel C between the cover 1 and the leg 7 of the mount 5 while the cover 1 is closed. For example, snow and rain often drips around the weather sealer 8 between the weather sealer 8 and the leg 7 of the mount 5 and builds up within the channel C. If the conditions are cold enough, this snow and rain can form an ice dam in the channel C around the perimeter P of the cover 1 and edge 22 of the trailer 2 between the leg 7 of the mount 5 and the weather sealer 8, thus preventing the cover 1 from being removed from the trailer 2.

Accordingly, what is needed is a trailer edge rail system an apparatus for securing a cover to a trailer that reduces the likelihood of the objects being transported from preventing the cover from being closed. The apparatus should preferably reduce the likelihood of debris preventing the cover from being closed and should be substantially weather tight. The apparatus should also preferably reduce the likelihood of damaging the cover struts. Lastly, the apparatus should preferably reduce the likelihood of an ice dam forming around the cover thereby preventing the cover from being opened.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

The present invention features trailer edge rail system for use with a trailer having a removable cover. According to one embodiment, the trailer edge rail system includes a first end region, a lip, and at least one protrusion. The first end region is adapted to be secured to an edge of the trailer. The lip extends generally transversely from a generally vertical plane of the edge of the trailer. The protrusion extends generally upwardly and parallel from the face of the edge of the trailer and is disposed proximate the first end region.

In the preferred embodiment, the trailer edge rail system further includes a cover defining an interior and an exterior region. The cover assembly and the cover are sized and shaped such that when the cover is in a closed position, the cover is disposed proximate an outer perimeter of the lip and the at least one protrusion is disposed within the interior region.

According to one embodiment, the first end region is an integral piece with the edge of the trailer (for example, the first end region and the trailer are a one-piece, unitary structure). Alternatively, the first end region is adapted to be removably secured to the edge of the trailer and preferably includes a C-shaped bracket. In the preferred embodiment, the lip includes at least one cavity disposed along a longitudinal axis of the edge of the trailer.

According to another embodiment, the present invention features a trailer edge rail system for use with a cover defining an interior region and an exterior region. The trailer edge rail system includes a bracket adapted to be removably secured to an edge of a trailer. A lip extends from the bracket generally transversely from a generally vertical plane of the edge of the trailer. A protrusion extends generally upwardly and parallel from the face of the edge of the trailer and is disposed proximate the first end region. The trailer edge rail system is sized and shaped such that when the cover is in a closed position, the cover is disposed proximate an outer perimeter of the lip and the at least one protrusion is disposed within the interior region.

In yet another embodiment, the present invention features a trailer edge rail system comprising a body, at least one protrusion, and a lip. The body defines at least one cavity disposed along a longitudinal axis of the trailer. A first end region of the body is adapted to be secured proximate an edge of a trailer. According to one embodiment, the first end region and the trailer are integrally connected. Alternatively, the first end region is removably secured to the trailer, preferably using a C-shaped bracket having a first and at least a second generally parallel securing regions disposed a spaced distance apart.

The protrusion is disposed proximate the first end region and extends generally upwardly and parallel from a generally vertical plane of the edge of the trailer. The lip extends generally transversely and outwardly from the at least one protrusion.

The trailer edge rail system optionally includes a cover defining an interior and an exterior region. The trailer edge rail system and the cover are sized and shaped such that when the cover is in a closed position, the cover is disposed proximate an outer perimeter of the lip and the at least one protrusion is disposed within the interior region. The cover optionally includes a seal disposed along a perimeter of the cover.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 2:
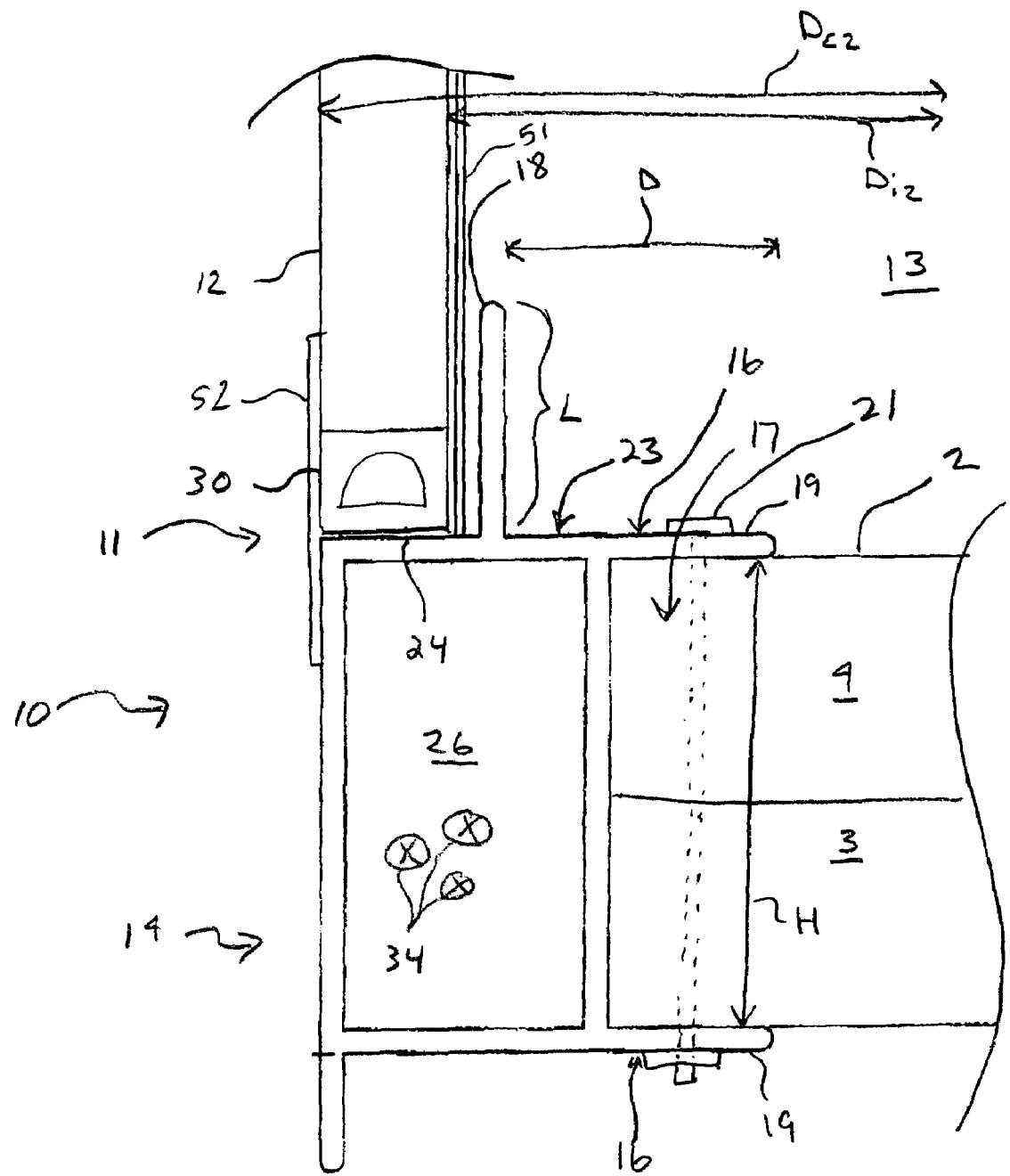
FIG. 2 is a plan view of a cross section of one embodiment of the cover assembly having a cavity according to the present invention.

A trailer edge rail system 10, FIG. 2, according to the present invention, is preferably mounted, fastened, molded, or otherwise secured to either the frame 3 and/or deck 4 of a trailer 2 or the like. As will be explained in greater detail hereinbelow, the cover 12 fits over the trailer edge rail system 10 proximate a lip 18 extending upwardly and the outer edge region 11 of the trailer 2. This arrangement covers the inside 13 of the trailer 2 from the elements and prevents access to the inside 13 or the trailer 2. The protrusion 18 also acts as a guide and reduces the likelihood of an object blocking the cover 12 from closing. Additionally, the trailer edge rail system 10, according to the present invention, reduces the likelihood of not being able to open/remove the cover 12 since the trailer edge rail system 10 does not include any channels wherein ice dams are likely to form and reduces leakage and also protects the cover strut 51.

According to one embodiment, the trailer edge rail system 10 includes a mount 14 having a bracket or biasing region 16. In the preferred embodiment, the bracket region 16 forms a cavity 17 sized and shaped to fit around at least a portion of the frame 3 and/or deck 4 of the trailer 2. In the exemplary embodiment, the cavity 17 includes a first and at least a second securing region 19 forming a "C" or "U" shaped bracket adapted to be secured to the frame 3 and/or deck 4 using one or more fasteners 21 (such as, but not limited to, bolts, screws, rivets, clamps, etc.), by welding, and/or by an adhesive. The exact dimensions of the cavity 17 will depend upon the dimensions of the trailer 2 to which it will be installed, and is within the knowledge of one of ordinary skill in the art without undue experimentation. For example, cavity may have a height H of approximately 3.0 inches and a depth D of sized to fit the desired floor framing.

In the closed position, the cover 12 is placed against a lip region 24 extending generally outwardly from the trailer 2. When closed, the cover 12 and the trailer edge rail system 10 prevent the elements from accessing the inside 13 of the cover 12 by forming a labyrinth-type seal. In the preferred embodiment, the cover 12 includes a seal 30, for example, but not limited to, a resilient, flexible seal such as a weather strip, neoprene, or the like. The seal 30 further prevents the elements from entering the inside 13 of the cover 2.

Figure 1:
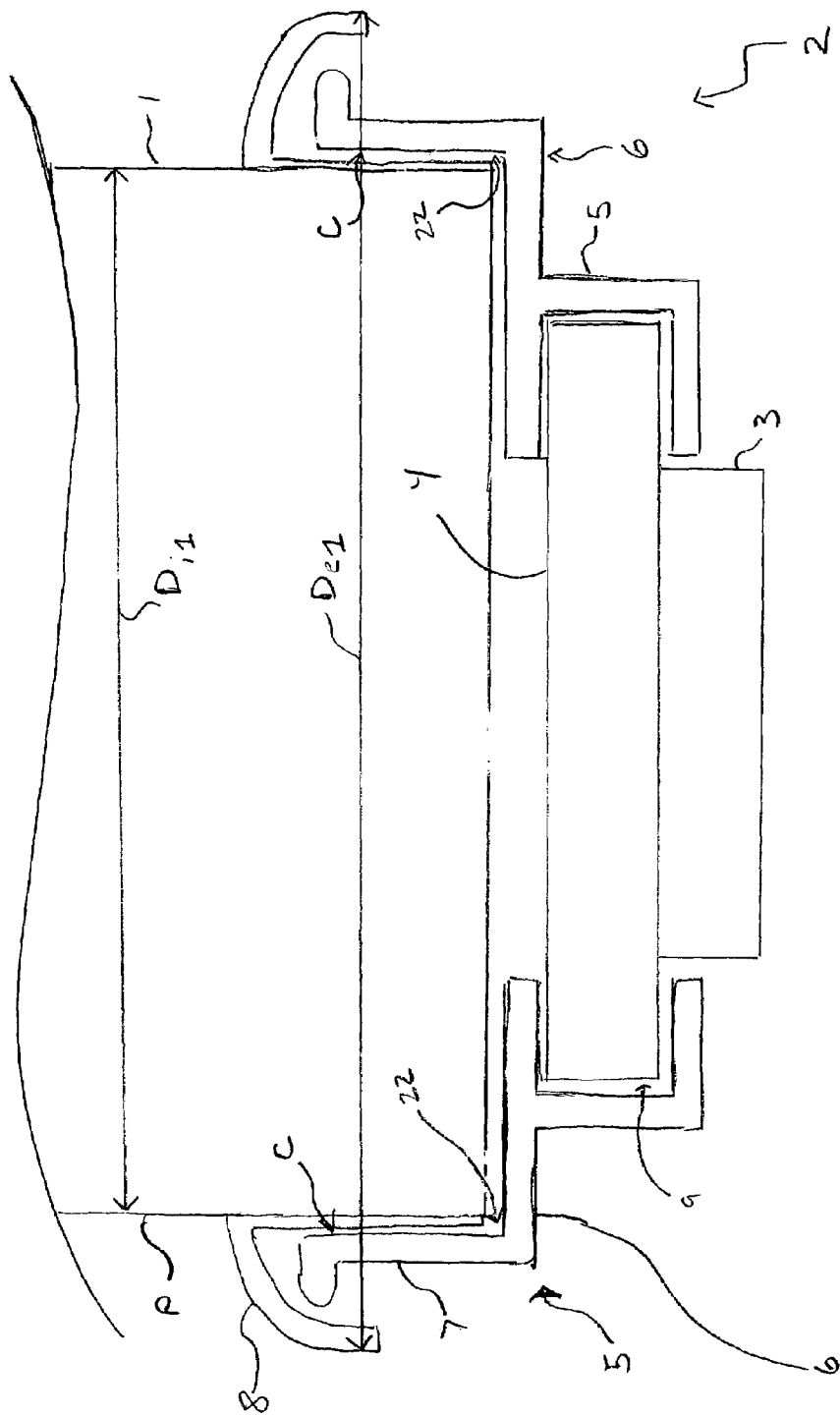
FIG. 1 is plan view of a cross section of the prior art removable covered trailers.

As discussed previously, the cover 1, FIG. 1, of the known, prior art covers is placed on the inside of the mount 5. Thus, the internal dimension $D_{i1}$ (i.e., the available storage space within the cover 1) is significantly smaller the overall or exterior dimension $D_{e1}$ of the trailer 2. Because the cover 12, FIG. 2, of the present invention is disposed proximate the outer edge 11 of the trailer edge rail system 10, the internal dimension $D_{i2}$ and length (i.e., the distanced between opposite sides of the cover) is approximately the same as the overall exterior dimension $D_{e2}$, and is greater than the internal dimension $D_{i1}$ of the prior art devices when comparing trailers having the same overall exterior dimension, $D_{e1}$, $D_{e2}$. This additional width facilitates the loading/unloading of equipment from the trailer 2, and allows the trailer 2 to hold larger equipment/objects. For example, it was found that a typical, two-sled snowmobile trailer 2 using the trailer edge rail system 10 according to the present invention has approximately 1 plus inch of additional space when compared to the prior art design having the same overall outer dimensions.

The mount 14 includes a top surface 23 having at least one lip or guide region 18 extending therefrom. In the preferred embodiment, the protrusion 18 extends generally outwardly and perpendicular to the top surface 23. The protrusion 18 is preferably disposed along the lip region 24 such that the protrusion 18 is in close proximity (approximately $\frac{1}{16}$") to the cover 12 and the protrusion 18 and the cover 12 form a labyrinth when the cover 12 is in the closed position. The length L of the protrusion 18 will depend on the size of the trailer 2, the size of the cover 12, and the objects to be stored on the trailer 2, and is within the knowledge of one of ordinary skill in the art without undue experimentation. For exemplary purposes only, the protrusion 18 has a length L of approximately 1.5 inches.

In a typical installation on a generally rectangular trailer 2, the protrusion 18 is disposed around three of the four sides (with the fourth side being open to facilitate taking objects on/off the trailer 2). Other arrangements are also possible, and the example given is for exemplary purposes only and is not intended to be limitation of the present invention.

As discussed above, the protrusion 18 functions as a guide and prevents an object being loaded on the trailer 2 from being placed too close to the edge 11 of the trailer 2. This is particularly useful when the trailer 2 is being used to store snowmobiles. When loading a snowmobile, the protrusion 18 acts as a guide thereby preventing the ski of the snowmobile (which is often the widest portion of the snowmobile) from Another function of the protrusion 18 is to serve as a weather sealer. In the event the elements get underneath the cover 12, the protrusion 18 also prevents the elements from entering any further within the inside 13 of the trailer 2. In a typical installation, the trailer 2 is often disposed at an angle relative to the ground with the front of the trailer 2 (i.e., the portion typically connected to the tow vehicle) being disposed higher than the back. The protrusion 18 serves to guide the elements (such as water, dirt, and snow) towards the rear of the trailer 2 where one or more drains may be disposed to allow the elements to escape out of the trailer 2.

Figure 3:
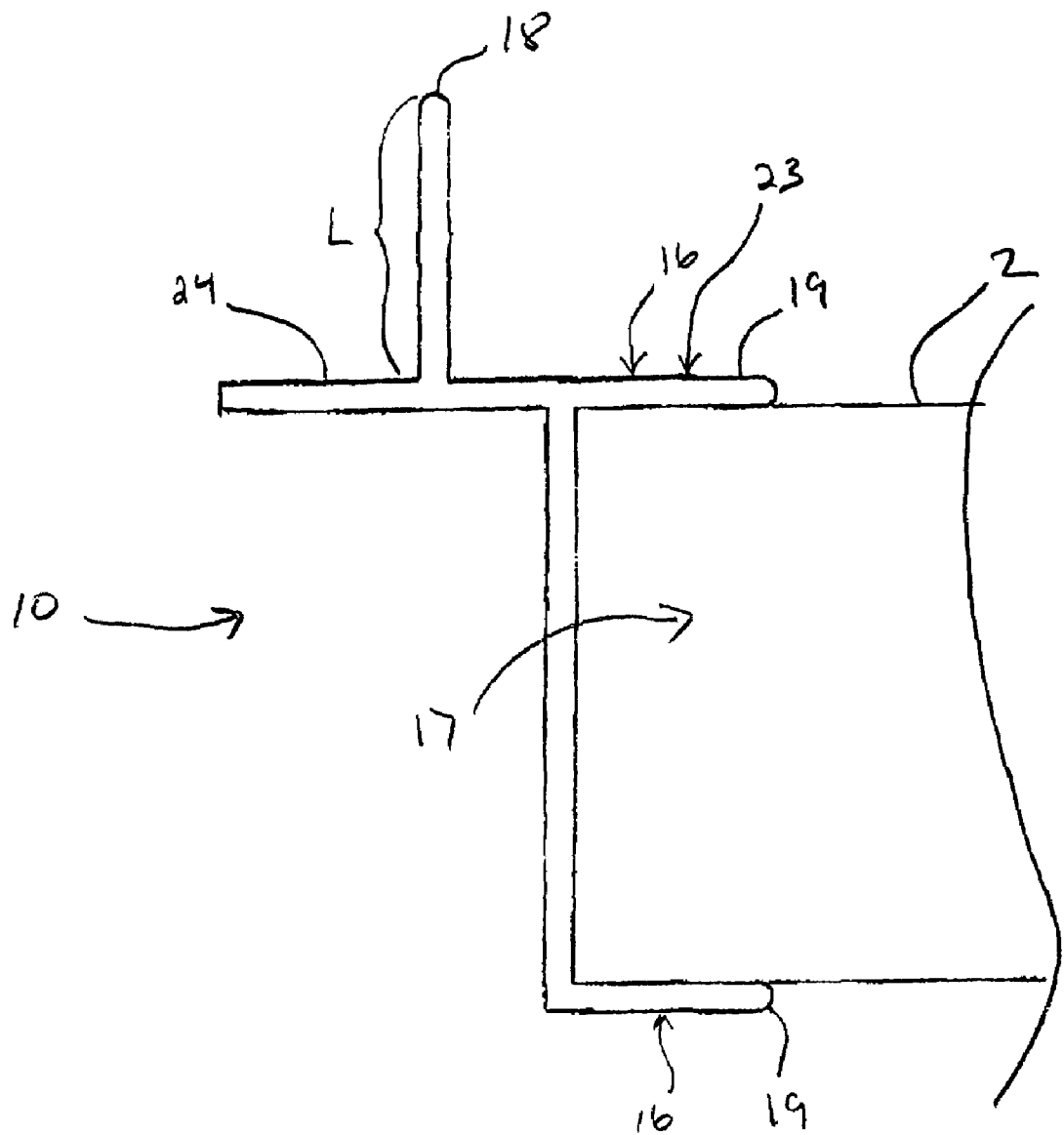
FIG. 3 is a plan view of a cross section of another embodiment of the cover assembly shown in FIG. 2 without a cavity according to the present invention.

According to the exemplary embodiment, the trailer edge rail system 10 also includes a cavity or pocket 26. The cavity 26 is sized and shaped to accept one or more wires, cables, brake lines, lights, etc. 34, and is preferably disposed beneath the lip region 24. The cavity 26 protects the wires 34 from damage and exposure to the elements. Additionally, the cavity 26 hides the wires 34, thus reducing the clutter and increasing the overall appearance of the trailer 2. Alternatively, the trailer edge rail system 10, FIG. 3, may not include the cavity 26.

Figure 4:
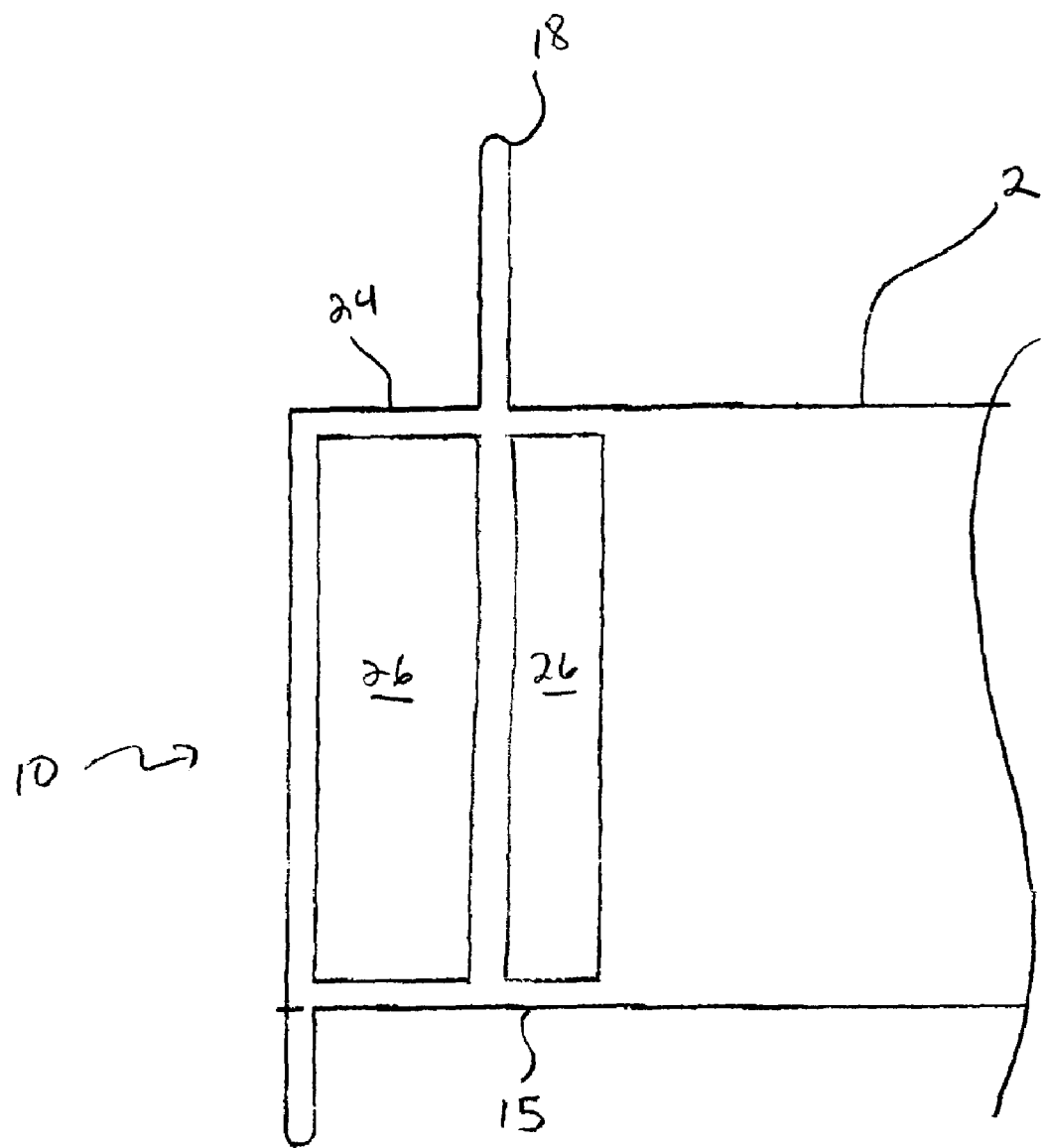
FIG. 4 is a plan view of a cross section of another embodiment of the cover assembly shown in FIG. 2 having two cavities wherein the cover assembly is an integral piece of the trailer according to the present invention.
Figure 5:
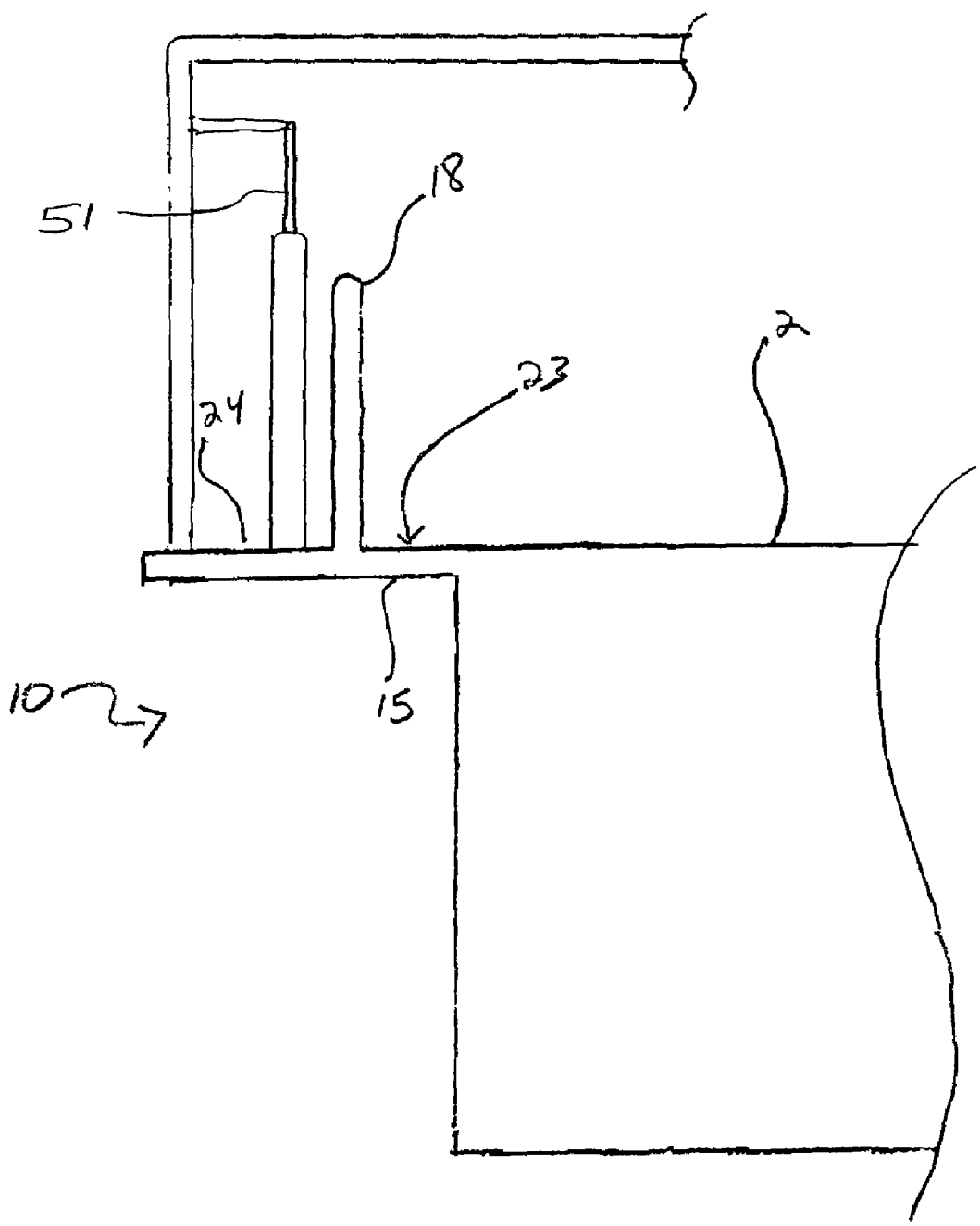
FIG. 5 is a plan view of a cross section of another embodiment of the cover assembly shown in FIG. 4 without a cavity according to the present invention.

According to yet another embodiment, the trailer edge rail system 10, FIG. 4, includes a body 15 which is molded or formed directly from the frame 3 of the trailer 2 and is an integral part of the frame 3. The body 15 include one or more lips 18 extending generally outwardly and perpendicular to the frame 3 as previously discussed, and includes the lip region 24 for mating with the cover 12. As shown in FIG. 4, the body 15 may optionally include one or more cavities 26 as discussed above, or as shown in FIG. 5, the body 15 may not include any cavities 26.

As discussed above, the cover 12, FIG. 5, may include a strut 51 used to support the cover 12 while in the open position. The strut 51 is preferably disposed proximate the lip region 24. This arrangement is beneficial because the lip 18 reduces the likelihood of the strut 51 being damaged during the loading/unloading of equipment. Additionally, the cover 12, FIG. 2, may optionally include a cover lip 52 sized and shaped to extend beyond the top surface of the lip region 24. The cover lip 52 further reduces leakage.

As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A trailer having a hinged trailer cover and a trailer edge rail system, said trailer comprising comprising:
   a trailer configured for being towed behind a vehicle, said trailer including at least a trailer frame and a generally planar frame deck having first and second side edge regions, a front edge region and a rear edge region;
   a trailer cover, sized to cover generally said entire generally planar trailer frame deck, said trailer cover hingedly coupled to said front edge region of said generally planar trailer frame deck and a configured to move between an open and a closed position;
   each said first and second side edge regions of said generally planar trailer frame deck including a trailer edge rail system, said trailer edge rail system including:
   an end region defining an outwardly most region of each of said first and second trailer frame deck edge regions; and
   at least one protrusion displaced inwardly from said outwardly most region of each of said first and second trailer frame deck edge regions, and extending generally upwardly transverse to said generally planar trailer frame deck and defining between said at least one protrusion and said outwardly most region of each of said first and second trailer frame deck edge regions a trailer cover closure region, said trailer cover closure region configured for receiving side portions of said trailer cover when said trailer cover is in a closed position.

2. The trailer of claim 1 wherein said trailer edge rail system is an integral piece with an edge of said trailer frame.

3. The trailer of claim 2 were in said trailer edge rail system and said trailer frame are a one-piece, unitary structure.

4. The trailer of claim 1 wherein said trailer edge rail system of each of said first and second side edge regions of said trailer frame deck include at least one cavity disposed along a longitudinal axis of each of said side edge regions of said trailer frame deck.

5. The trailer of claim 1, wherein said trailer edge rail system is adapted to be removably secured to said first and second side edge regions of said trailer frame deck.

6. The trailer of claim 5, wherein said trailer edge rail system includes a C-shaped region to removably secure or said trailer edge rail system to each said respective first and second side edge regions of said trailer frame deck.

7. The trailer of claim 5, wherein said trailer edge rail system of each of said first and second side edge regions of said trailer frame deck include at least one cavity disposed along a longitudinal axis of each of said side edge regions of said trailer frame deck.

8. The trailer as claimed in claim 1 wherein said trailer cover further includes a seal disposed along a perimeter of said trailer cover.

9. The trailer of claim 1, wherein said front edge region of said generally planar trailer frame deck includes said trailer edge rail system.

10. A trailer having a hinged trailer cover and a trailer edge rail system, said trailer comprising comprising:
    a trailer configured for being towed behind a vehicle, said trailer including at least a trailer frame and a generally planar frame deck having first and second side edge regions, a front edge region and a rear edge region;

a trailer cover, sized to cover generally said entire generally planar trailer frame deck, said trailer cover hingedly coupled to said front edge region of said generally planar trailer frame deck and a configured to move between an open and a closed position;

said front edge region and each said first and second side edge regions of said generally planar trailer frame deck including a trailer edge rail system, said trailer edge rail system including:

an end region defining an outwardly most region of each of said first and second trailer frame deck side edge regions and said front edge region;

at least one protrusion displaced inwardly from said outwardly most region of each of said first and second trailer frame deck side edge regions and said front edge region, and extending generally upwardly transverse to said generally planar trailer frame deck and defining between said at least one protrusion and said outwardly most region of each of said first and second trailer frame deck edge regions and said front edge region a trailer cover closure region, said trailer cover closure region configured for receiving side and front portions respectively of said trailer cover when said trailer cover is in a closed position; and wherein said trailer edge rail system of each of said first and second side edge regions of said trailer frame deck include at least one cavity disposed along a longitudinal axis of each of said side edge regions of said trailer frame deck.

* * * * *